United States Patent
Meesala et al.

(10) Patent No.: US 12,234,149 B2
(45) Date of Patent: Feb. 25, 2025

(54) CO-PRODUCTION OF HYDROGEN-ENRICHED COMPRESSED NATURAL GAS AND CARBON NANOTUBES

(71) Applicant: HINDUSTAN PETROLEUM CORPORATION LIMITED, Bengaluru (IN)

(72) Inventors: Lavanya Meesala, Bengaluru (IN); Pramod Kumar, Bengaluru (IN)

(*) Notice: Subject to any disclaimer, the term of this patent is extended or adjusted under 35 U.S.C. 154(b) by 526 days.

(21) Appl. No.: 17/642,029

(22) PCT Filed: Aug. 3, 2021

(86) PCT No.: PCT/IB2021/057088
§ 371 (c)(1),
(2) Date: Mar. 10, 2022

(87) PCT Pub. No.: WO2022/049427
PCT Pub. Date: Mar. 10, 2022

(65) Prior Publication Data
US 2022/0332573 A1    Oct. 20, 2022

(30) Foreign Application Priority Data
Sep. 4, 2020  (IN) .............................. 202041038358

(51) Int. Cl.
*C01B 3/26* (2006.01)
*B01J 8/26* (2006.01)
*C01B 32/162* (2017.01)

(52) U.S. Cl.
CPC .................. *C01B 3/26* (2013.01); *B01J 8/26* (2013.01); *C01B 32/162* (2017.08);
(Continued)

(58) Field of Classification Search
CPC . C01B 3/26; C01B 32/162; C01B 2203/0277; C01B 2203/06;
(Continued)

(56) References Cited

U.S. PATENT DOCUMENTS 2,639,973 A * 5/1953 Fritz .................. B01J 8/189
                                          422/142
2,664,967 A * 1/1954 Molstedt .............. B01J 8/30
                                          422/142
(Continued)

OTHER PUBLICATIONS

MacKenzie, et al., An Updated Review of Synthesis Parameters and Growth Mechanism for Carbon Nanotubes in Fluidized Beds, Ind. Eng. Chem. Res. 2010; 49: 5323-5338 (Year: 2010).*
(Continued)

*Primary Examiner* — Daniel C. Mccracken
(74) *Attorney, Agent, or Firm* — Bradley Arant Boult Cummings

(57) ABSTRACT

The present subject matter relates to co-producing H-CNG and CNTs. The process comprises adding catalyst to a first reactor (110) and activating the catalyst and performing a reaction to obtain H-CNG and CNTs. At a first predetermined time after reaction has progressed in the first reactor (110), catalyst is added to a second reactor (120), activated, and then the reaction proceeds simultaneously in the first reactor (110) and second reactor (120). The use of multiple reactors with staggered start times helps in the continuous co-production of H-CNG and CNTs. Catalyst preparation process is integrated with the co-production process for efficient heat recovery. The first and second reactors are fluidized bed reactors with cantilever trays having weirs for controlling the residence time of the catalyst in the reactor and thereby controlling the purity of CNTs produced.

23 Claims, 4 Drawing Sheets

(52) U.S. Cl.
CPC .. *C01B 2203/0277* (2013.01); *C01B 2203/06* (2013.01); *C01P 2002/82* (2013.01)

(58) Field of Classification Search
CPC ...... C01B 2203/049; C01B 2203/0883; C01B 2203/1005; C01B 2203/1047; C01B 2203/1058; C01B 2203/1082; C01B 2203/141; C01B 3/30; C01B 2202/30; C01B 2203/1064; C01B 2203/1076; C01B 2203/1235; B01J 8/26; B01J 8/003; B01J 8/0035; B01J 8/008; B01J 2208/00557; B01J 2208/00884; B01J 2208/00938; B01J 8/0055; B01J 8/1809; B01J 8/1827; B01J 8/1836; B01J 8/1845; B01J 8/1872; C01P 2002/82; Y02P 30/40
See application file for complete search history.

(56) References Cited

U.S. PATENT DOCUMENTS

| | | | | |
|---|---|---|---|---|
| 2,697,653 | A * | 12/1954 | Nicholson | B01J 8/30 422/142 |
| 3,288,878 | A * | 11/1966 | Hachmuth | B01J 8/189 585/662 |
| 6,413,487 | B1 * | 7/2002 | Resasco | D01F 9/1272 427/249.1 |
| 7,993,594 | B2 | 8/2011 | Wei et al. | |
| 9,463,429 | B2 | 10/2016 | Nakamura et al. | |
| 10,343,104 | B2 | 7/2019 | Denton et al. | |
| 2004/0000697 | A1 * | 1/2004 | Setoguchi | B82Y 30/00 257/432 |
| 2004/0151654 | A1 * | 8/2004 | Wei | B82Y 40/00 422/139 |
| 2005/0042162 | A1 * | 2/2005 | Resasco | D01F 9/1272 423/447.3 |
| 2006/0057054 | A1 * | 3/2006 | Fujioka | D01F 9/127 422/600 |
| 2007/0154382 | A1 * | 7/2007 | Edwin | D01F 9/1278 422/139 |
| 2012/0219490 | A1 * | 8/2012 | Noda | B01J 37/347 422/618 |
| 2019/0084832 | A1 | 3/2019 | Hu et al. | |

OTHER PUBLICATIONS

International Search Report and Written Opinion for PCT/IB2021/057088 mailed Nov. 26, 2021, all pages.

* cited by examiner

CO-PRODUCTION OF HYDROGEN-ENRICHED COMPRESSED NATURAL GAS AND CARBON NANOTUBES

TECHNICAL FIELD

The present subject matter relates generally to co-production of hydrogen-enriched compressed natural gas (H-CNG), and in particular to processes and apparatuses for co-producing H-CNG and carbon nanotubes (CNTs).

BACKGROUND

Hydrogen-enriched compressed natural gas (H-CNG) is a mixture of natural gas and methane. H-CNG can be used as a fuel in vehicles that use CNG and has several advantages over CNG. H-CNG is a much cleaner fuel than CNG and has significantly lesser carbon monoxide and NOx emissions compared to conventional CNG, along with better fuel economy. The use of H-CNG is considered to be a step toward achieving cleaner and renewable fuels. H-CNG is generally prepared by adding hydrogen to CNG, with the hydrogen being produced using processes, such as steam reformation reaction of hydrocarbons or thermal decomposition of methane. However, these processes of generating H-CNG are expensive and require large operational and capital costs.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components where possible.

DETAILED DESCRIPTION

Figure 1:
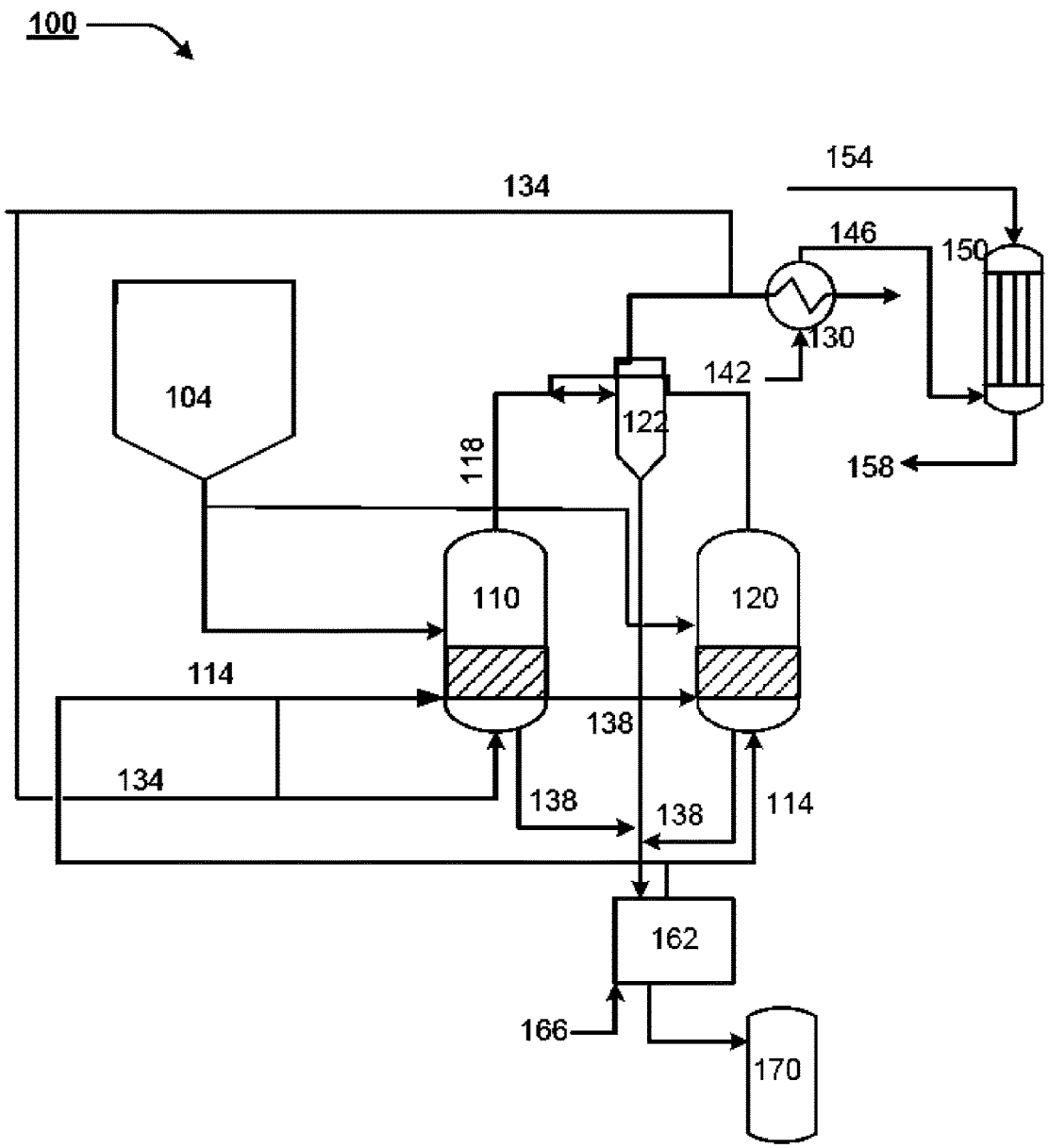
FIG. 1 is a schematic illustration of an example process of producing H-CNG and CNTs, in accordance with an embodiment of the present subject matter.

The present subject matter relates to production of hydrogen-enriched compressed natural gas (H-CNG) and carbon nanotubes (CNTs). H-CNG is CNG which includes a certain amount of hydrogen. H-CNG is an alternative fuel to CNG that is cleaner and produces significantly lesser carbon monoxide and NOx. Addition of hydrogen to CNG is considered to be a step towards moving to hydrogen-based fuels and a hydrogen economy. Generally, the volume of hydrogen added varies between 15-20%, which amounts of 4-9% of energy.

H-CNG is generally produced by reformation of steam and natural gas. The reaction produces hydrogen that is then mixed with CNG. However, the reaction also produces a significant amount of carbon dioxide and carbon monoxide, which have to be separated, and are generally released to the air, increasing pollution. Steam reformation is an endothermic equilibrium reaction and hence, it requires high temperatures of 800-900° C. and a significant amount of energy input to proceed in the forward direction. Furthermore, the blending equipment used is expensive. This increases capital and operating costs.

Another process that may be used is to decompose methane in the presence of a catalyst to produce methane and hydrogen. The temperatures required for the decomposition range from 500-1200° C. One prior art technique uses microwave irradiation to selectively heat a catalyst that decomposes methane into carbon and hydrogen. However, the use of microwave irradiation requires a special reactor that is transparent to microwaves and a microwave generator. This requires additional capital investment and operating costs.

Furthermore, in all the conventional processes for methane decomposition using catalyst, carbon is deposited on the catalyst, thereby reducing catalyst activity. Thus, the catalyst needs to be removed and sent for regeneration and fresh catalyst is to be added. This process requires that the reactor be stopped during the change of catalyst, which prevents the continuous production of H-CNG and thus reduces productivity and increases operational and product costs.

The present subject matter overcomes these and other disadvantages of conventional processes of production of H-CNG and relates to processes and apparatuses for continuous and simultaneous production of H-CNG and CNTs. An example process comprises performing a reaction cycle in a first fluidized bed reactor (FBR) loaded with catalyst. The reaction cycle includes the steps of, activating the catalyst using a first gas comprising hydrogen gas, wherein the catalyst comprises an active metal catalyst; passing a hydrocarbon feed gas through the FBR after stopping passage of the first gas; allowing a cracking reaction to proceed for a predefined time in the FBR to obtain a spent catalyst comprising CNTs deposited on the catalyst, and a product gas comprising H-CNG and entrained spent catalyst; removing the product gas continuously and the spent catalyst at predetermined time intervals from the FBR; passing the product gas through a cyclone to separate the entrained spent catalyst and obtain separated product gas, wherein the entrained spent catalyst is mixed with the spent catalyst removed from the FBR; separating CNTs from the spent catalyst to obtain product CNTs; recovering heat from the separated product gas by exchanging heat with a fluid stream in a heat recovery unit to obtain recovered product gas and a heated fluid stream; passing the heated fluid stream through a catalyst reactor comprising an active metal catalyst and a catalyst support for preparation of the catalyst prior to loading the catalyst in the FBR, wherein at least a part of the recovered product gas is passed as the first gas in the FBR to activate the catalyst in step (i); and stopping the reaction in the FBR and removing remaining spent catalyst and product gases. Further, the catalyst is loaded in a second FBR and the reaction cycle is performed in the second FBR at a first predetermined time after the reaction cycle in the first FBR has started. The second FBR remains operational for a second predetermined after the reaction cycle in the first FBR is stopped. The catalyst is then loaded in the first FBR and the reaction cycle is performed in the first FBR at a third predetermined time after the reaction cycle in the second FBR has started. The first FBR remains operational for a fourth predetermined after the reaction cycle in the second FBR is stopped. The steps are repeated for continuous co-production of H-CNG and CNTs.

An example apparatus for co-production of hydrogen-enriched compressed natural gas (H-CNG) and carbon nanotubes (CNTs) by the above mentioned process is also provided. The apparatus includes a hydrocarbon feed gas tank; at least two fluidized bed reactors (FBRs); a heat recovery unit to recover heat from the product gases and produce the heated fluid stream; a catalyst reactor to receive the catalyst support, active metal catalyst, and the heated fluid stream for catalyst preparation; and a CNT collector to collect the product CNTs. Each fluidized bed reactor comprises a shell; trays disposed as cantilevers at different heights along a height of the shell to hold active metal catalyst, wherein successive trays are attached to diametrically opposite ends of the shell, and wherein each tray has a weir at a free end to form a catalyst holding volume on the tray; catalyst inlets provided over each tray to allow the active metal catalyst to be placed on the trays; gas distributors provided below each tray for allowing the hydrocarbon feed gas to enter the reactor for undergoing the cracking reaction in presence of the active metal catalyst to produce the H-CNG and CNTs; a gas outlet disposed on a top of the shell to allow the product gases comprising H-CNG to exit the reactor; and a catalyst outlet disposed at a bottom of the shell to remove the spent catalyst comprising CNTs from the reactor on stopping the reaction.

The present subject matter also relates to fluidized bed reactors for producing H-CNG and CNTs. The reactor comprises an shell and one or more trays disposed at different heights along a height of the reactor to hold catalyst. The diameter of the trays is less than a diameter of the shell so that passages are formed between the free end of the trays and an inner surface of the shell. One or more catalyst inlets are provided to allow catalyst to enter the trays. One or more inlets are disposed on the shell to allow natural gas to enter the reactor. A gas outlet is disposed on a top of the shell to allow product gases to exit the reactor. A CNT outlet is disposed at a bottom of the shell to remove CNTs from the reactor. In one example, the reactor comprises a reactor body and the shell with the trays, catalyst inlets, gas distributors, gas outlet, and catalyst outlets affixed thereto is formed as an integrated reactor unit. The integrated reactor unit may be removably disposed in the reactor body, for example, as a cartridge. This allows the cartridge to be easily removed from the reactor body and replaced with a new cartridge each time a new reaction cycle is to be carried out in the reactor, thereby simplifying the operation and reducing downtime.

The process of the present subject matter allows for the simultaneous and continuous production of H-CNG and CNTs by the decomposition of methane in the presence of catalyst. The use of multiple reactors, such as a first and second reactor, with different start times allows for continuous production of H-CNG and CNTs, as when catalyst is being activated in one reactor the reaction can continue in the second reactor. There is no production of carbon dioxide or carbon monoxide using the present process, which makes it more environmentally friendly than conventional processes. The amount of hydrogen in the product gases may be easily controlled by the temperature of the reaction.

Furthermore, as heat may be recovered using a heat recovery system and recycled back into the process, the process is highly energy efficient. For additional heat integration, the catalyst preparation can also be performed in the process. For example, the catalyst support material, such as biochar, can be steamed during the catalyst preparation process and a catalyst precursor material can be injected on the steamed biochar. Alternatively, active metal-doped biochar can be steamed using the heat generated. This makes the catalyst preparation process and the process for generating H-CNG and CNTs an integrated process.

The CNTs produced may be more than 95% pure. The spent catalyst, which has deposited CNTs, may be directly used as a composite material, without any purification, because of its superior mechanical and electrical properties. Alternatively, the CNTs may be separated from the spent catalyst and may be separately used while the spent catalyst may be regenerated and reused.

The fluidized bed reactor of the present subject matter may be operated for long hours, for example, more than 20 hours. In an example, the reactor may be operated for 45 hours or more. The fluidized bed reactor can operate in bubbling regime/fast fluidization regime basis the specific space velocities used. During long operation, the carbon deposition in the distributors may lead to additional pressure drop. The reactor of the present subject matter prevents this additional pressure drop. The presence of the one or more trays at different heights in the reactor allows catalyst to be added first to the first tray, reaction allowed to progress, then to the next tray and so on. This prevents a lot of carbon deposition at one time and prevents excess pressure drop in the reactor. In addition, each tray may have separate feed inlets, allowing for greater control of the reaction. The presence of weirs on the trays with variable heights allows for varying the residence time of the catalyst on a tray, which can be used to control the reaction time. Control of reaction time and residence time allows for different qualities of CNTs to be produced as desired.

Aspects of the present subject matter are further described in conjunction with the appended figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and implementations of the present subject matter, as well as specific examples thereof, are intended to encompass equivalents thereof.

FIG. 1 is a schematic illustration of an example process of producing H-CNG and CNTs, in accordance with an embodiment of the present subject matter. The process comprises adding a catalyst from a catalyst hopper 104 to a first reactor 110. The catalyst may be an active metal catalyst with metal-based catalysts comprising, for example, nickel or iron-based catalysts and promoters, such as Pt, Pd, Cu, Zr, Zn and $CeO_2$. The use of active metal catalysts helps in production of CNTs as an additional product along with H-CNG. The catalyst may be supported on supports such as alumina or biochar. Other supports, such as different types of zeolite like Y-zeolite, ZSM-5, beta-zeolite, MFI zeolite, Mordenite, MgO, $SiO2$, spent FCC catalyst, and the like may also be used in other examples. The reactor is then heated to reach the catalyst activation temperature of about 500-650° C. A first gas comprising hydrogen gas may be allowed to enter the first reactor 110 for catalyst activation. The hydrogen in the first gas reduces the catalyst and makes it active for the decomposition of hydrocarbon feed gas subsequently. In an example, the first gas may be H-CNG or the hydrocarbon feed gas with hydrogen added to it. In one example, the activation may be performed for 3-8 hours.

When the catalyst activation is complete, the supply of the first gas is stopped and feed 114 is allowed to enter the first reactor 110. The feed 114 may be a hydrocarbon feed gas. In one example, the hydrocarbon feed gas is compressed natural gas, which may predominantly be methane, or other light hydrocarbons, such as methane, ethane, propane, butane, ethylene, acetylene, or petroleum fractions like naphtha, crude oil, diesel, clarified oil, or combinations thereof. In an example, the depleted first gas obtained during catalyst activation may be mixed with the feed 114.

The feed 114 may be allowed to react in the presence of the activated catalyst, whence the feed 114 decomposes to produce hydrogen and CNTs due to cracking. In an example, the reaction is allowed to proceed at about 550° C. and atmospheric pressure. In another example, the reaction may be allowed to proceed over a temperature range of 300 and 800° C. The reaction may be allowed to proceed for 20-50 hours in an example. The reaction temperature is chosen so that the amount of hydrocarbon decomposition may be controlled. In an example, when the reaction temperature is 550° C., the amount of hydrogen produced by methane decomposition is about 18-25% by volume. Higher reaction temperatures will lead to more hydrogen production and lower reaction temperatures will lead to lower hydrogen production. Hence, the reaction temperature chosen will allow controlling the amount of hydrogen and consequently, the amount of CNT produced.

When the reaction is progressing in the first reactor 110, at a first predetermined time after reaction has started, catalyst may be added to a second reactor 120 to charge the second reactor. In some examples, it may be added at the same time when the reaction in the first reactor 110 starts. In another example, it may be added with a time lag of, for example 2-5 hours. The catalyst in the second reactor 120 may be activated by passing the first gas and activating at 500-750° C. for 5-8 hours, similar to the reaction cycle used in the first reactor. After activation, supply of the first gas is stopped and feed 114, comprising hydrocarbon feed gas, is allowed to enter the second reactor 120. The feed 114 may be allowed to react in the second reactor 120 at 550° C. and atmospheric pressure to produce H-CNG and CNTs. In an example, the reaction conditions in the second reactor 120 may be similar to those used in the first reactor 110. In another example, the reaction conditions in the second reactor 120 may be different from those used in the first reactor 110 to allow production of a different composition of H-CNG and CNT purity, if desired.

In an example, the first predetermined time after which fresh catalyst is added to the second reactor 120 may be such that reaction progresses in the second reactor 120 simultaneously as the catalyst activation proceeds in the first reactor 110. In another example, the first predetermined time after which fresh catalyst is added to the second reactor 120 is such that reaction to produce H-CNG and CNTs progresses simultaneously in both the first reactor 110 and second reactor 120. Further, the second reactor 120 may remain operational, i.e., reaction in the second reactor 120 may continue for a second predetermined time after the reaction in the first reactor 110 is stopped.

Similarly, the catalyst may be loaded in the first reactor 110 and the reaction cycle may be performed in the first reactor 110 at a third predetermined time after the reaction cycle in the second reactor 120 has started. The first reactor may remain operational for a fourth predetermined after the reaction cycle in the second reactor 120 is stopped.

Thus, reaction in the two reactors may progress such that continuous production of the H-CNG and CNTs is obtained. The use of the first reactor 110 and second reactor 120 allow the production of H-CNG and CNTs to proceed continuously without stopping production for catalyst activation, removal of products, or addition of fresh catalyst. The first and second reactors may be fluidized bed reactors (FBRs) as discussed below.

As will be understood, there may be more than two reactors used with staggered starting times for continuous production of H-CNG. Further, the reactors can be used in series, parallel, or in combination of series and parallel to achieve the desired purity of CNTs. Purity of CNTs refers to the percentage of CNT deposited on catalyst by weight.

As the reaction progresses in either the first reactor 110 or the second reactor 120, the product gases 118, which comprise hydrogen mixed with CNG, or H-CNG, may be continuously collected from the top of the first reactor 110 or the second reactor 120. The product gases 118 may be passed through a cyclone 122, or other filters to separate them from the entrained spent catalyst and obtain separated product gas. In an example, a slide valve may be provided downstream of the reactors 110 and 120 or the cyclone 122 to allow continuous removal of product gases comprising H-CNG. A standpipe may be provided to build sufficient head required to operate the slide valve. While in the figure a single cyclone has been shown common to both the reactors, in another implementation, each reactor may be connected individually to a cyclone.

After separation from the catalyst, the separated product gases may be passed through a heat recovery unit, such as a heat exchanger 130, using a fluid stream 142. The separated product gases may also comprise unreacted hydrocarbons, which may be further separated and fed back into the first reactor 110 and second reactor 120 as a slip stream 134. The separation may be achieved, for example, by having a pressure swing adsorption (PSA) by passing the slip stream 134 through PSA for obtaining pure hydrogen. In an example, the pure hydrogen thus obtained may be mixed with the first gas and used for catalyst activation. Allowing the hot slip stream 134 back into the process also provides for heat recovery, reducing the heat requirement for the reaction. Further, the heat may be recovered at the heat exchanger 130 using a fluid stream 142. In an example, the fluid stream 142 may comprise water, steam, nitrogen, hydrocarbon feed gas, or combination thereof. After passing through the heat exchanger 130, a heated fluid stream 146 may be used for other processes, such as catalyst preparation in a catalyst reactor 150, or may be recycled back for heat exchange with the feed streams for reaction in the first reactor 110 or second reactor.

In an example, the heated fluid stream may be passed through the catalyst reactor 150, having an active metal catalyst and a catalyst support, for preparation of the catalyst prior to loading the catalyst in the first or second reactor. For example, an inlet stream 154 comprising carbon and biomass may be fed to the catalyst reactor 150. The heated fluid stream 146 from the heat exchanger 130 may be allowed to the enter the catalyst reactor 150, which allows heating of the inlet stream 154, thus reducing the heat required for the catalyst preparation reaction. The prepared catalyst, for example, with activated carbon and biochar may be removed from the catalyst reactor 150 bottom as an outlet stream 158 and provision may be made to dope active metal in the reactor 150. The reactor 150 may have inlets for allowing steam, inert gas, or active metal salt to enter the reactor for catalyst preparation. The prepared catalyst can be then used for loading catalyst into the first and second reactors 110, 120.

The product gasses, after passing through the heat exchanger 130 to heat the fluid stream 142 may be referred to as recovered product gases. At least a part of the recovered product gas may be passed with the first gas in the first and second reactors to activate the catalyst, thereby reducing the heat requirement for catalyst activation.

This heat recycling or reuse at multiple steps in the process makes the process of the present subject matter very energy efficient leading to reduced energy-related operating costs.

The CNTs formed during the reaction are deposited on the spent catalyst and fall to the bottom of the reactors 110, 120 and in an example may be collected from the reactor bottom as stream 138. Spent catalyst, which has CNTs deposited on it, may also be collected from the bottom of the cyclone 122. In some examples, spent catalyst streams 138 may be removed from the reactors at predetermined time period depending on the purity of the CNTs desired. In an example, opposing high speed jets may be provided in the reactors 110 and 120 to separate CNTs from the spent catalyst. The separated CNTs may be collected from the bottom of the reactors 110 and 120 or form the cyclone 122.

In an example, as the spent catalyst recovered from the cyclone or from the bottom of the reactor is hot, the spent catalyst may be passed through a second heat recovery system 162. The second heat recovery system 162 may recover heat from the spent catalyst by heating a hydrocarbon feed gas stream 166, prior to sending it as feed to the first reactor 110 or the second reactor 120. After passing through the second heat recovery system 162, the spent catalyst may be collected in a spent catalyst collector 170 and may be sent for further processing, such as recovery of CNTs and regeneration. In one example, the CNTs may be separated from the spent catalyst by acid digestion, sonication, or mechanical attrition or a combination thereof After the reactions have been carried out in the reactors for the required time periods, the reactions may be stopped and remaining spent catalyst and product gases may be removed and the reactors may be recharged for the next cycle. For example, after removing product gases 118, CNTs, and spent catalyst, fresh catalyst may be added to the first reactor 110 and the above process steps repeated to produce H-CNG and CNTs. Similarly, after removing product gases 118, CNTs, and spent catalyst, fresh catalyst may be added to the second reactor 120 and the above process steps repeated. Although two reactors are shown, any number of reactors may be used for producing H-CNG and CNTs.

In an example, the process of the present subject matter may be performed using an apparatus 100 as shown in the schema of FIG. 1. The apparatus 100 comprises a catalyst hopper 104 to provide catalyst to the first reactor 110 and the second reactor 120. In an example, different catalyst hoppers may be provided for each reactor. Two or more fluidized bed reactors, for example, first reactor 110 and second reactor 120, may be present for reaction of natural gas to produce H-CNG and CNTs. Cyclones 122 may be disposed for separation of product gases 118. The apparatus 100 may further comprise a collector for collecting CNTs and a first heat recovery unit 130 and a heat recovery unit 162 for recovering heat.

In one example, the apparatus 100 may include a hydrocarbon feed gas tank, at least two fluidized bed reactors (FBRs), a heat recovery unit to recover heat from the product gases and produce the heated fluid stream, a catalyst reactor to receive the catalyst support, active metal catalyst, and the heated fluid stream for catalyst preparation; and a CNT collector to collect the product CNTs. Each fluidized bed reactor may comprise a shell; trays disposed as cantilevers at different heights along a height of the shell to hold active metal catalyst, wherein successive trays are attached to diametrically opposite ends of the shell, and wherein each tray has a weir at a free end to form a catalyst holding volume on the tray; catalyst inlets provided over each tray to allow the active metal catalyst to be placed on the trays; gas distributors provided below each tray for allowing the hydrocarbon feed gas to enter the reactor for undergoing the cracking reaction in presence of the active metal catalyst to produce the H-CNG and CNTs; a gas outlet disposed on a top of the shell to allow the product gases comprising H-CNG to exit the reactor; and a catalyst outlet disposed at a bottom of the shell to remove the spent catalyst comprising CNTs from the reactor on stopping the reaction. The configuration of example fluidized bed reactors is further described below with reference to FIG. 2.

Figure 2:
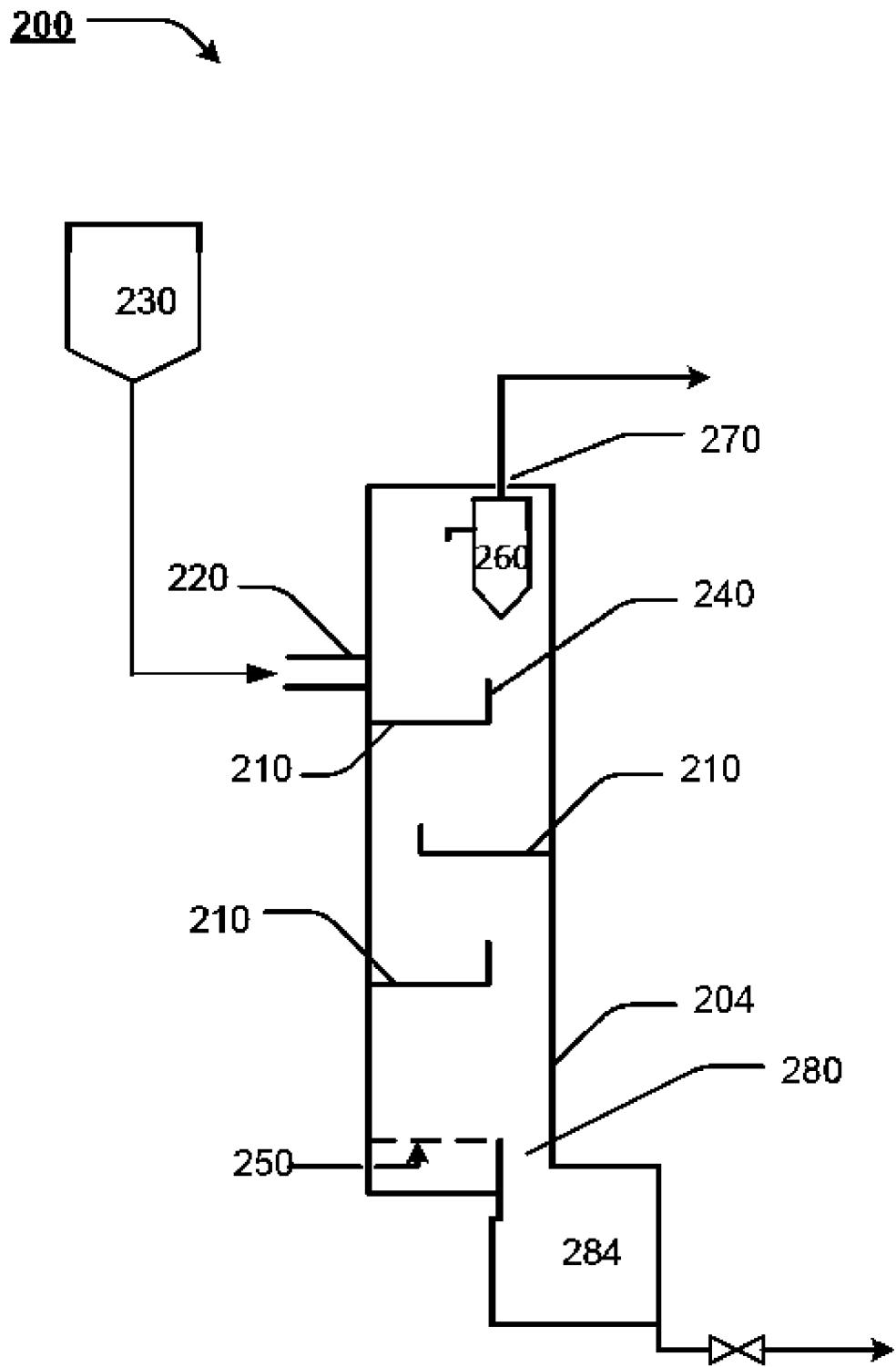
FIG. 2 illustrates an example reactor for producing H-CNG and CNTs, in accordance with an embodiment of the present subject matter.

FIG. 2 illustrates an example fluidized bed reactor for producing H-CNG and CNTs, in accordance with an embodiment of the present subject matter. The example reactor 200 may be used as the first reactor 110 or the second reactor 120 or both. In an example, the reactor 200 comprises a shell 204. The shell may be cylindrical in shape. The reactor 200 may be a fluidized bed reactor. One or more trays 210 (210a, 210b . . . ) may be disposed at different heights along a height of the reactor 200 to hold active metal catalyst. A diameter of the trays 210 is less than a diameter of the shell 204. The trays 210 may be fixed to the shell 204 on one end and are free at the other end with a space being provided between the end of the tray and the shell. Thus, the trays 210 form a cantilever. This allows for forming passages between the free end of the one or more trays 210 and an inner surface of the shell 204. Further, successive trays may be fixed to the shell 204 at diametrically opposite ends of the shell 204 to allow catalyst from a higher tray to fall onto a lower tray through the passages and to prevent creation of a straight path for reactant and product gases to rise through the passages. The trays 210 may be made of any metal and may be solid with apertures. In another example, the trays 210 may be have a mesh-like structure and may be made of active metals like stainless steel, which can itself act as a catalyst.

The reactor 200 further comprises one or more catalyst inlets 220 disposed on the shell 204 to allow catalyst to be placed on the trays 210. The catalyst may be dispensed via a catalyst hopper 230 that may be connected to the catalyst inlet 220. In an example, there may be one catalyst inlet 220 and catalyst may be dispensed on all the trays 210 via this catalyst inlet 220 as the catalyst overflows from one tray to another. In another example, each tray may have a separate catalyst inlet 220 to allow catalyst to be deposited on each tray. The use of separate catalyst inlets 220 for each tray 210 allows greater flexibility in controlling the amount of catalyst to be dispensed on each tray. Furthermore, with separate inlets, each tray 210 can be filled with catalyst independently of the other trays 210, allowing flexibility in operation of the reactor 200. Each tray may act as a fluidized bed reactor with flow of reactant and product gases that pass through the trays fluidizing the active metal catalyst placed thereon and allow the cracking reaction to proceed. The tray bottom may have apertures to allow gas to flow through the tray 210. The size of the aperture is chosen so that gas can flow through, but catalyst cannot pass through. For example, the aperture size may be less than 40 μm.

The trays 210 comprise a weir 240 disposed on the free end of the tray 210 to form a catalyst holding volume on each tray to form individual fluidized beds on each tray. The height of the weir 240 determines the volume of catalyst on the tray 210 and the residence time of the catalyst on the tray 210 as explained below. In an example, all the trays 210 may have weirs 240 of the same height. In another example, the height of the weirs 240 may be different on different trays 210. In this case, different amounts of catalyst may be dispensed on different trays 210 and the CNTs deposited on each tray may be removed at different times.

During operation, in an example, for a given weir height for a first tray 210a, after a certain time of reaction, catalyst expands as carbon will be deposited on the catalyst. The size of the catalyst particle may double, and the density may decrease by 2 times. Thus, the catalyst can no longer be contained by the first tray 210a and falls to the second tray 210b. Reaction may proceed using the catalyst on the second tray 210b, where the residence time is determined by the height of the weir 240 on the second tray 210b. In a fluidized bed reactor, when reactions are run continuously for a long time, for example, 18-20 hours, it may lead to agglomeration of the catalyst. The presence of trays 210 with different weir heights is advantageous as it allows staggered deposition of CNTs on the catalyst within a single reactor, which prevents agglomeration of catalyst, allowing longer run times. If the reaction is performed in a single stage, all the resulting carbon from a single weight hourly space velocity (WHSV) will be deposited on the catalyst in large amounts, leading to quick agglomeration because of particle growth. Repeated deposition of carbon on the catalyst leads poor quality of CNTs.

The presence of trays 210 also allows for different reaction times within a single reactor. As each stage, comprising of the tray 210, has its individual feed inlet, varying the flow rate can result in different amounts of conversion of the feed. Different conversion amounts produce different quality and morphology of CNTs. Since reaction time for catalyst in each tray 210 can be controlled independently, for example, by removing the catalyst from a tray 210 after a certain time or stopping a gas feed to a tray 210, different qualities of CNTs may be obtained as required from a single reactor. In various examples, nozzles may be provided on each stage or tray 210 to allow steam or inert gas to enter to separate CNTs from the spent catalyst.

The reactor 200 comprises one or more gas distributors 250 disposed on the shell 204 for allowing gas to enter the reactor 200. In an example the gas distributor 250 may be disposed at a bottom of the reactor 200. In another example, gas distributors 250 may be disposed substantially near each tray 210 so that each tray 210 may have an independent gas distributor 250. The presence of independent gas distributors 250 for each tray 210 allows flexibility in allowing gas to enter each tray 210 independently. The gas distributors 250 may be used to feed H-CNG for catalyst activation and natural gas for the reaction to produce H-CNG and CNTs.

The reactor 200 may further comprise cyclones 260 on a top portion of the reactor 200. Product gases may pass through the cyclones 260, whence they are separated from catalyst. Product gases may be removed from a gas outlet 270 disposed on top of the shell 204 and may be further sent to an external cyclone for separation as shown in FIG. 1. A CNT outlet 280 may be disposed at a bottom of the shell 204 to remove CNTs from the reactor 200. The CNTs may be collected in a CNT collector 284. Once the reaction is complete, the reactor 200 may be emptied to collect CNTs deposited in other locations, such as on the trays 210 or outside the collection zone of the collector 284.

In one example, a catalyst inlet is provided adjacent to and above each tray and a gas distributor is provided adjacent to and below each tray. Further, individual additional spent catalyst outlets may be provided on the shell 204 for each tray to allow removal of spent catalyst from the trays.

In one example, the reactor comprises a reactor body (not shown) and the shell with the trays, catalyst inlets, gas distributors, gas outlet, and catalyst outlets affixed thereto is formed as an integrated reactor unit. The integrated reactor unit may be removably disposed in the reactor body, for example, as a cartridge. This allows the cartridge to be easily removed from the reactor body and replaced with a new cartridge each time a new reaction cycle is to be carried out in the reactor, thereby simplifying the operation and reducing downtime.

EXAMPLES

The disclosure will now be illustrated with working examples, which are intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

Figure 3:
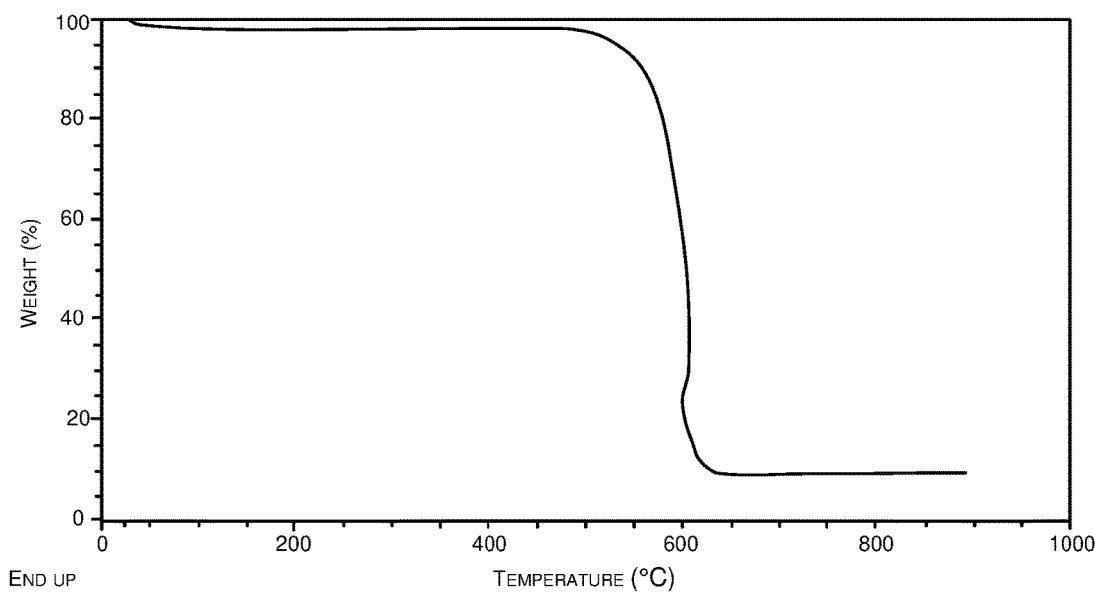
FIG. 3 illustrates an example thermogravimetric analysis result of CNTs produced in accordance with an embodiment of the present subject matter.

In the first step, a catalyst was loaded into the hopper from where 15 g of it was transferred to a fluidized bed reactor (FBR). As a pre-requisite to the reaction procedure, the reactor was heated to 550° C. and flushed with $N_2$ gas at 15 SLPH (standard liters per hour). The loaded catalyst was then reduced/activated under hydrogen enriched natural gas/pure hydrogen atmosphere at 550-580° C. for 3-5 h. Following this, flow-controlled piped natural gas (feed gas) was passed through the catalyst bed in FBR and the reaction was allowed to proceed for more than 20 h at 550° C. The hydrogen gas produced from a catalytic reaction on natural gas, yielded hydrogen enriched natural gas (H-CNG) as the product stream and a spent catalyst comprising char and carbon nanotubes. Another by-product of the reaction was multi walled CNTs (MWCNTs), which were deposited at the bottom of the reactor. The H-CNG product stream was passed through cyclone/hot filter and collected for further applications while the heat recovered from the hot filter was utilized in activating the catalyst. Once the reaction was complete in the FBR, the spent catalyst was emptied using either vacuum or high velocity to cyclone it to the spent catalyst unloading vessel. This spent catalyst was analyzed using TGA, SEM, and Raman analysis. At different time intervals, product gas sample was collected and analyzed in GC equipped with flame ionization detector (FID) and thermal conductivity detector (TCD). Differential pressure transmitter (DPT) reading was monitored continuously to stop the reaction as the CNT deposition on the catalyst lead to a high pressure drop. This further lead to choking in the gas distributor. Hence, even though catalyst might be active in some cases, reaction was terminated due to high-pressure drop. In commercial scale reactors, this can be avoided using ring sparger kind of gas distributors in place of lab scale sintered or wire mesh distributors FIG. 3 illustrates an example thermogravimetric analysis result of CNTs produced, in accordance with an embodiment of the present subject matter. The curve obtained is typical for carbon nanotube materials, with a dip in the curve starting around 400° C. Analysis of the curve indicates that the carbon nanotubes obtained are more than 92% pure.

Figure 4:
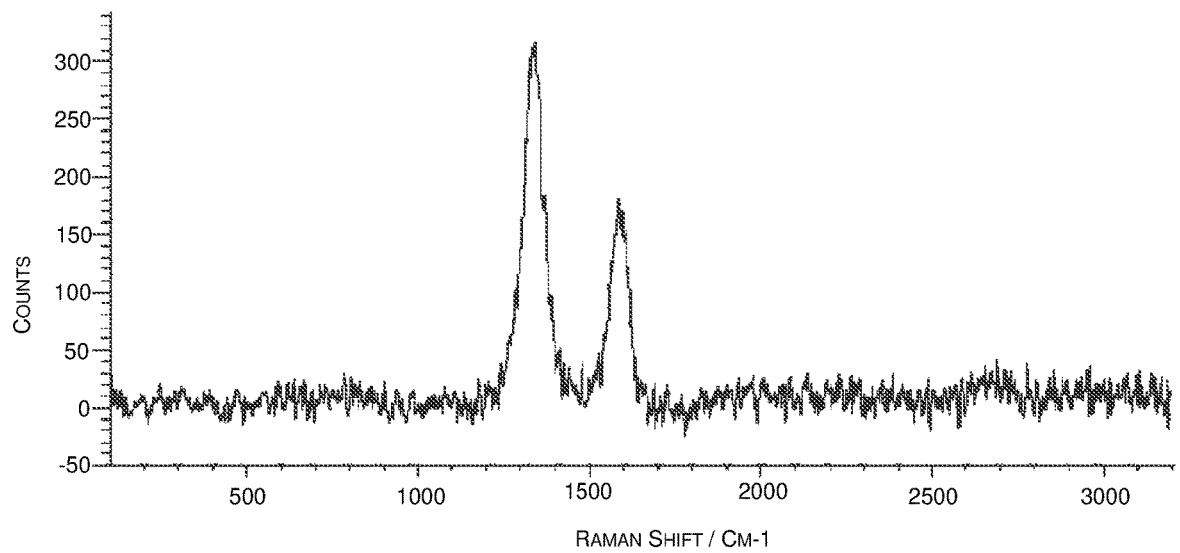
FIG. 4 illustrates an example Raman spectrum of CNTs produced in accordance with an embodiment of the present subject matter.

FIG. 4 illustrates an example Raman spectrum of CNTs produced, in accordance with an embodiment of the present subject matter. The ratio between the D-band and the G-band in a Raman spectrum of a carbon material indicates the quality of a carbon material. The ratio $I_d/I_g$ obtained here is 1.83. In other example, the ratio is between 0.5 and 2.5.

Figure 5:
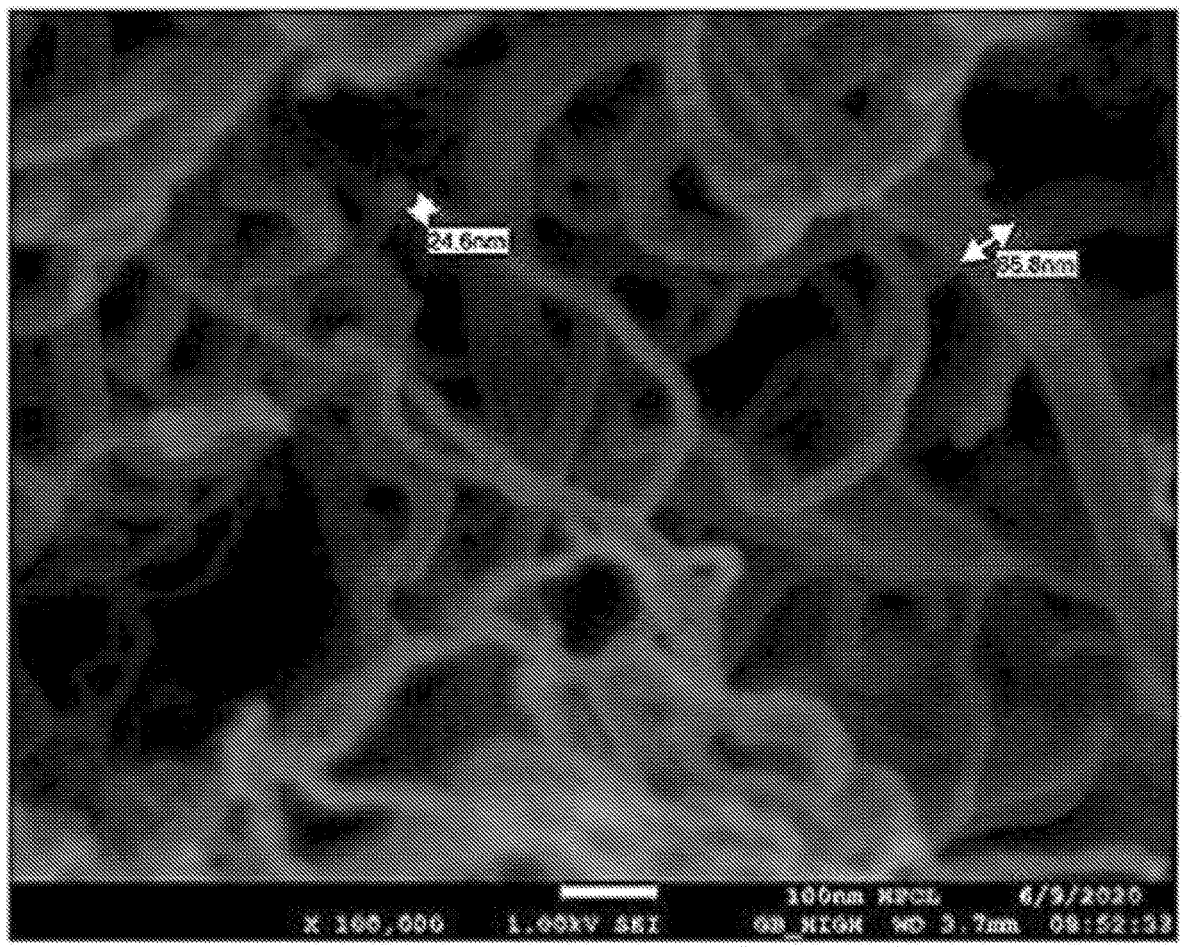
FIG. 5 illustrates an example scanning electron microscopy image of CNTs produced in accordance with an embodiment of the present subject matter.

FIG. 5 illustrates an example scanning electron microscopy image of the CNTs, in accordance with an embodiment of the present subject matter. The images show the formation of CNTs with diameters between about 25 nm and 66 nm. In another example CNT diameter may be 60-120 nm.

Although the present subject matter is described in language specific to structural features, it is to be understood that the specific features and process are disclosed as example embodiments for implementing the claimed subject matter.

We claim:

1. A process for co-production of hydrogen-enriched compressed natural gas (H-CNG) and carbon nanotubes (CNTs), the process comprising:
   a. performing a reaction cycle in a first fluidized bed reactor (FBR) loaded with catalyst, the reaction cycle comprising:
      i. activating the catalyst using a first gas comprising hydrogen gas, wherein the catalyst comprises an active metal catalyst;
      ii. passing a hydrocarbon feed gas through the FBR after stopping passage of the first gas;
      iii. allowing a cracking reaction to proceed for a predefined time in the FBR to obtain a spent catalyst comprising CNTs deposited on the catalyst, and a product gas comprising H-CNG and entrained spent catalyst;
      iv. removing the product gas continuously and the spent catalyst at predetermined time intervals from the FBR;
      v. passing the product gas through a cyclone to separate the entrained spent catalyst and obtain separated product gas, wherein the entrained spent catalyst is mixed with the spent catalyst removed from the FBR;
      vi. separating CNTs from the spent catalyst to obtain product CNTs;
      vii. recovering heat from the separated product gas by exchanging heat with a fluid stream in a heat recovery unit to obtain recovered product gas and a heated fluid stream;
      viii. passing the heated fluid stream through a catalyst reactor comprising an active metal catalyst and a catalyst support for preparation of the catalyst prior to loading the catalyst in the FBR, wherein at least a part of the recovered product gas is passed as the first gas in the FBR to activate the catalyst in step (i); and
      ix. stopping the reaction in the FBR and removing remaining spent catalyst and product gases;
   b. loading the catalyst in a second FBR and performing the reaction cycle comprising steps (i-ix) in the second FBR at a first predetermined time after the reaction cycle in the first FBR has started, wherein the second FBR remains operational for a second predetermined after the reaction cycle in the first FBR is stopped;
   c. loading the catalyst in the first FBR and performing the reaction cycle comprising steps (i-ix) in the first FBR at a third predetermined time after the reaction cycle in the second FBR has started, wherein the first FBR remains operational for a fourth predetermined after the reaction cycle in the second FBR is stopped; and
   d. repeating steps (a-c) for continuous co-production of H-CNG and CNTs.

2. The process as claimed in claim 1, comprising recovering heat from the spent catalyst by exchanging heat with the hydrocarbon feed gas before sending the hydrocarbon feed gas to the first FBR or the second FBR.

3. The process as claimed in claim 1, comprising mixing a depleted first gas obtained after catalyst activation with the hydrocarbon gas feed sent to the first FBR or second FBR, wherein the depleted first gas is depleted of hydrogen gas.

4. The process as claimed in claim 1, wherein the cracking reaction proceeds at between 500 and 750° C. for 10 to 50 hours.

5. The process as claimed in claim 1, wherein the spent catalyst, after separation of product CNTs, is regenerated and mixed with fresh catalyst for loading the first FBR or second FBR.

6. The process as claimed in claim 1, comprising injecting a catalyst precursor onto the catalyst support in the catalyst reactor while passing the heated fluid stream to in-situ generate the active metal catalyst in the catalyst support.

7. The process as claimed in claim 1, comprising depositing the active metal catalyst on the catalyst support in the catalyst reactor prior to passing the heated fluid stream.

8. The process as claimed in claim 1, wherein the catalyst support is selected from alumina, biochar, Y-zeolite, ZSM-5, beta-zeolite, MFI zeolite, Mordenite, MgO, SiO2, spent FCC catalyst, or combinations thereof.

9. The process as claimed in claim 1, wherein the active metal catalyst is Ni or Fe-based catalyst with promoters selected from Pt, Pd, Cu, Zr, Zn, $CeO_2$, and combinations thereof.

10. The process as claimed in claim 1, wherein the hydrocarbon feed gas is selected from compressed natural gas, methane, ethane, propane, butane, ethylene, acetylene, naphtha, crude oil, diesel, clarified oil, or combinations thereof.

11. The process as claimed in claim 1, wherein the first gas is hydrogen mixed with the hydrocarbon feed gas or H-CNG.

12. The process as claimed in claim 1, wherein separating the CNTs from the spent catalyst is performed by acid digestion, sonication, or mechanical attrition or a combination thereof.

13. The process as claimed in claim 1, wherein the fluid stream for heat recovery comprises water, steam, nitrogen, hydrocarbon feed gas, or combination thereof.

14. An apparatus for co-production of hydrogen-enriched compressed natural gas (H-CNG) and carbon nanotubes (CNTs) by the process as claimed in any one of the preceding claims, the apparatus comprising:
   a. a hydrocarbon feed gas tank;
   b. at least two fluidized bed reactors (FBRs), wherein each fluidized bed reactor comprises:
      a shell;
      trays disposed as cantilevers at different heights along a height of the shell to hold active metal catalyst, wherein successive trays are attached to diametrically opposite ends of the shell, and wherein each tray has a weir at a free end to form a catalyst holding volume on the tray;
      catalyst inlets provided over each tray to allow the active metal catalyst to be placed on the trays;
      gas distributors provided below each tray for allowing the hydrocarbon feed gas to enter the reactor for undergoing the cracking reaction in presence of the active metal catalyst to produce the H-CNG and CNTs;
- a gas outlet disposed on a top of the shell to allow the product gases comprising H-CNG to exit the reactor; and
- a catalyst outlet disposed at a bottom of the shell to remove the spent catalyst comprising CNTs from the reactor on stopping the reaction;

c. a heat recovery unit to recover heat from the product gases and produce the heated fluid stream;

d. a catalyst reactor to receive the catalyst support, active metal catalyst, and the heated fluid stream for catalyst preparation; and e. a CNT collector to collect the product CNTs.

15. A fluidized bed reactor (FBR) for co-production of hydrogen-enriched compressed natural gas (H-CNG) and carbon nanotubes (CNTs), the reactor comprising:
- a shell;
- trays disposed at different heights along a height of the shell to hold active metal catalyst, wherein a diameter of the trays is less than a diameter of the shell such that passages are formed between free ends of the trays and an inner surface of the shell;
- catalyst inlets provided on the shell to allow the active metal catalyst to be placed on the trays;
- gas distributors attached to the shell for allowing hydrocarbon feed gas to enter the reactor for undergoing cracking reaction in presence of the active metal catalyst to produce H-CNG and CNTs;
- a gas outlet disposed on a top of the shell to allow product gases comprising H-CNG to exit the reactor; and
- a catalyst outlet disposed at a bottom of the shell to remove spent catalyst comprising CNTs from the reactor.

16. The FBR as claimed in claim 15, wherein the trays are fixed to the shell at one end forming cantilevers.

17. The FBR as claimed in claim 15, wherein successive trays are fixed to the shell at diametrically opposite ends of the shell to allow catalyst from a higher tray to fall onto a lower tray through the passages and to prevent creation of a straight path for reactant and product gases to rise through the passages.

18. The FBR as claimed in claim 15, wherein a weir is disposed on a free end of each of the trays to form a catalyst holding volume on each tray to form individual fluidized beds on each tray.

19. The FBR as claimed in claim 18, wherein the weirs are of varying heights.

20. The FBR as claimed in claim 15, wherein the trays comprise apertures provided in a base of the tray to allow flow of reactant and product gases to pass through the trays to fluidize the active metal catalyst placed thereon and allow the cracking reaction to proceed.

21. The FBR as claimed in claim 15, comprising additional spent catalyst outlets to allow removal of spent catalyst from the trays.

22. The FBR as claimed in claim 15, comprising a reactor body, wherein the shell with the trays, catalyst inlets, gas distributors, gas outlet, and catalyst outlets affixed thereto is formed as an integrated reactor unit, and wherein the integrated reactor unit is removably disposed in the reactor body.

23. The FBR as claimed in claim 15, wherein a catalyst inlet is provided adjacent to and above each tray and a gas distributor is provided adjacent to and below each tray.

* * * * *